(12) United States Patent
Hsu et al.

(10) Patent No.: US 10,804,786 B2
(45) Date of Patent: Oct. 13, 2020

(54) INTERACTIVE ELECTROMAGNETIC APPARATUS

(71) Applicant: YUZEN SUSTAINABLE ENERGY CO., LTD., Taichung (TW)

(72) Inventors: Yungshun Hsu, Taichuung (TW); Mingchun Hsu, Taichuung (TW); Wenyu Hsu, Taichuung (TW)

(73) Assignee: YUZEN SUSTAINABLE ENERGY CO., LTD., Taichung (TW)

( * ) Notice: Subject to any disclaimer, the term of this patent is extended or adjusted under 35 U.S.C. 154(b) by 267 days.

(21) Appl. No.: 16/064,459

(22) PCT Filed: Dec. 22, 2015

(86) PCT No.: PCT/CN2015/098169
§ 371 (c)(1),
(2) Date: Jun. 21, 2018

(87) PCT Pub. No.: WO2017/107034
PCT Pub. Date: Jun. 29, 2017

(65) Prior Publication Data
US 2019/0013723 A1   Jan. 10, 2019

(51) Int. Cl.
*H02K 35/02* (2006.01)
*H02K 35/06* (2006.01)

(52) U.S. Cl.
CPC ............ *H02K 35/02* (2013.01); *H02K 35/06* (2013.01)

(58) Field of Classification Search
CPC ............................... H02K 35/02; H02K 35/06
See application file for complete search history.

(56) References Cited

U.S. PATENT DOCUMENTS

| | | | | |
|---|---|---|---|---|
| 2003/0234585 A1* | 12/2003 | Tu | ............................ | H01F 7/021 310/12.12 |
| 2007/0159011 A1* | 7/2007 | Terzian | ...................... | F03G 7/08 310/15 |
| 2010/0109450 A1* | 5/2010 | Unger | ..................... | H02K 33/16 310/30 |
| 2011/0063059 A1* | 3/2011 | Takahashi | ................ | H02K 1/34 335/306 |
| 2011/0187207 A1* | 8/2011 | Arnold | ................... | H02K 35/02 310/11 |

* cited by examiner

*Primary Examiner* — Jue Zhang
(74) *Attorney, Agent, or Firm* — Leong C. Lei

(57) ABSTRACT

An interactive electromagnetic apparatus, which includes an acting magnet assembly, a conducting magnet assembly parallel with the acting magnet assembly, an induction coil assembly arranged between the acting magnet assembly and the conducting magnet assembly, and an induction switch module, in which the acting magnet assembly includes at least two magnets arranged to space from each other. These magnets have magnetic poles face the induction coil assembly. The adjacent ones of the magnets are arranged to have opposite magnetic poles face each other. The conducting magnet assembly includes at least two magnets arranged to space from each other. These magnets have two ends having magnetic poles parallel with a moving direction. As such, the induction coil assembly generates a reverse magnetic resistance force at only one end thereof.

6 Claims, 8 Drawing Sheets

INTERACTIVE ELECTROMAGNETIC APPARATUS

(a) TECHNICAL FIELD OF THE INVENTION

The present invention belongs to a field of electromagnetic technology for energy conversion, and more specifically to an interactive electromagnetic apparatus that helps reduce increase of reverse magnetic resistance force and generates a forward magnetic assistance force so as to achieve the purposes of reducing loss of kinetic energy and speeding up operation, to thereby increase energy conversion rate thereof.

(b) DESCRIPTION OF THE PRIOR ART

A known electromagnetic apparatus comprises an induction coil assembly arranged between two opposite magnet assemblies and the magnet assemblies and the induction coil assembly are respectively referred to as a rotor and a stator that are relatively movable with respect to each other, wherein the two magnet assemblies are formed by arranging magnets having magnet poles facing the induction coil assembly such that the magnetic poles of the magnets of the magnet assembly correspond to the induction coil assembly (namely, the magnetic lines of force perpendicularly intersect a moving direction). Since the magnetic lines of force are densest around a center line of the magnetic poles, when the electromagnetic apparatus, under a relative motion, has the magnetic lines of force cutting the induction coil assembly to generate an effect of electricity generation, the induction coil assembly is caused by loading to generate an electric current so as to be induced through magnetic excitation to form an electromagnet, causing two ends of the induction coil assembly to generate magnetic poles that generate, with respect to the magnetic poles of the magnets of the magnet assembly that is in movement, a reverse magnetic resistance force opposite to an advancing direction of the movement.

In other words, for loading of power generation for a known electromagnetic apparatus, the two ends of the induction coil assembly respectively generates a reverse magnetic resistance force, namely two reverse magnetic resistance forces being generated. This, for the electromagnetic apparatus in operation, due to the magnet assembly being simultaneously affected by the reverse magnetic resistance forces on the two ends of the induction coil assembly, causes an opposite force that is adverse to moving forward thereby causing a significant amount of loss of kinetic energy, affecting the overall energy conversion rate of the electromagnetic apparatus. Thus, it is desired in the industry to achieve a development helping improving such a problem.

In view of the above, the present inventor have worked deeply on the issues that application of the known electromagnetic apparatus faces and aggressively searches for a solution based on years' experience of development as engaging in the related industry, to thereby, through endeavor of repeated study and trial, eventually successfully develop an interactive electromagnetic apparatus, which overcomes the shortcomings and loss of the known electromagnetic apparatus caused by increase of reverse magnetic resistance force.

SUMMARY OF THE INVENTION

Thus, the primary objective of the present invention is to provide an interactive electromagnetic apparatus, which reduces increase of reverse magnetic resistance force of an induction coil assembly so as to achieve reduction of loss of kinetic energy and improve energy conversion rate thereof.

Further, the primary objective of the present invention is to provide an interactive electromagnetic apparatus, which generates a forward magnetic assistance force to effectively speed up operation, to thereby further improving the energy conversion rate thereof.

Based on these, the present invention generally uses the following technical solutions to achieve the above objectives and efficacies thereof:

An interactive electromagnetic apparatus comprises:

an induction coil assembly, which comprises at least one coil;

an acting magnet assembly, which is arranged at one end of the induction coil assembly, the acting magnet assembly being movable relative to the induction coil assembly to generates an effect of electricity generation, the acting magnet assembly comprising two magnets that are arranged to space from each other and are respectively defined as a first magnet and a second magnet, the first and second magnets being arranged in a form having two magnetic poles located side by side, such that an axis line of upper and lower magnetic poles perpendicularly intersects a moving direction and the first and second magnets are arranged to have one of the magnetic poles face a coil axis of the induction coil assembly, and the magnetic poles of adjacent ones of the first and second magnets are arranged to be opposite to each other;

a conducting magnet assembly, which is arranged at one end of the induction coil assembly that is different from the acting magnet assembly, the conducting magnet assembly being movable, in synchronization with the acting magnet assembly, relative to the induction coil assembly, the conducting magnet assembly comprising at least two magnets arranged to space from each other and respectively defined as a third magnet and a fourth magnet, the third and fourth magnets being arranged to have two magnetic poles opposite to each other such that an axis line of left and right magnetic poles of the magnets is in parallel with a moving direction, the third and fourth magnets respectively corresponding to spacing locations between adjacent second and first magnets and between adjacent first and second magnets of the acting magnet assembly, lines as extensions of surfaces of the magnetic poles at two ends of the third and fourth magnets being coincident with lines of extensions of two side surfaces of the first and second magnets that are different from the magnetic poles thereof, the magnetic poles of the adjacent ones of the third and fourth magnets being arranged to have identical polarities adjacent to each other and facing opposite pole of the first and second magnets of the acting magnet assembly; and an induction switch module, which comprises an induction assembly arranged to correspond to an axis of the coil of the induction coil assembly, the induction switch module comprising an electrical conduction detection assembly that is operable to detect the induction assembly and is arranged to correspond to one side of each of the first and second magnets that is relatively moving into the coil and an electrical cut-off detection assembly that is operable to detect the induction assembly and is arranged to correspond to one side of each of the first and second magnets that is relatively moving away from the coil in order to control an operation signal of conducting connection or cut-off between the coil and a load.

Further, in a condition that the N magnetic pole of the first magnet faces the induction coil assembly, the S magnetic poles of the third and fourth magnets face each other and face the N magnetic pole of the first magnet; and in a condition that the S magnetic pole of the second magnet faces the induction coil assembly, the N magnetic poles of the third and fourth magnets face each other and face the S magnetic pole of the second magnet.

An interactive electromagnetic apparatus comprises:

an induction coil assembly, which comprises at least one coil;

an acting magnet assembly, which is arranged at one end of the induction coil assembly, the acting magnet assembly being movable relative to the induction coil assembly to generates an effect of electricity generation, the acting magnet assembly comprising two magnets that are arranged to space from each other and are respectively defined as a first magnet and a second magnet, the first and second magnets being arranged in a form having two magnetic poles located side by side, such that an axis line of upper and lower magnetic poles perpendicularly intersects a moving direction and the first and second magnets are arranged to have one of the magnetic poles face a coil axis of the induction coil assembly, and the magnetic poles of adjacent ones of the first and second magnets are arranged to be opposite to each other;

a conducting magnet assembly, which is arranged at one end of the induction coil assembly that is different from the acting magnet assembly, the conducting magnet assembly being movable, in synchronization with the acting magnet assembly, relative to the induction coil assembly, the conducting magnet assembly comprising at least two magnets arranged to space from each other and respectively defined as a third magnet and a fourth magnet, the third and fourth magnets being arranged to have two magnetic poles opposite to each other such that an axis line of left and right magnetic poles of the magnets is in parallel with a moving direction, the third and fourth magnets respectively corresponding to spacing locations between adjacent second and first magnets and between adjacent first and second magnets of the acting magnet assembly, lines as extensions of surfaces of the magnetic poles at two ends of the third and fourth magnets being coincident with lines of extensions of two side surfaces of the first and second magnets that are different from the magnetic poles thereof, the magnetic poles of the adjacent ones of the third and fourth magnets being arranged to have identical polarities adjacent to each other and facing opposite pole of the first and second magnets of the acting magnet assembly; and an induction switch module, which comprises an induction assembly arranged to correspond to an axis of the coil of the induction coil assembly, the induction switch module comprising an electrical cut-off detection assembly that is operable to detect the induction assembly and is arranged at one side of each of the first and second magnets that is moving into the coil and an electrical conduction detection assembly that is operable to detect the induction assembly and is arranged at one side of the first and second magnets that is moving away from the coil in order to control an operation signal of conducting connection or cut-off between the coil and a load.

Further, in a condition that the N magnetic pole of the first magnet faces the induction coil assembly, the S magnetic poles of the third and fourth magnets face each other and face the N magnetic pole of the first magnet; and in a condition that the S magnetic pole of the second magnet faces the induction coil assembly, the N magnetic poles of the third and fourth magnets face each other and face the S magnetic pole of the second magnet.

An interactive electromagnetic apparatus comprises:

an induction coil assembly, which comprises at least one coil;

an acting magnet assembly, which is arranged at one end of the induction coil assembly, the acting magnet assembly being movable relative to the induction coil assembly to generates an effect of electricity generation, the acting magnet assembly comprising two magnets that are arranged to space from each other and are respectively defined as a first magnet and a second magnet, the first and second magnets being arranged in a form having two magnetic poles located side by side, such that an axis line of upper and lower magnetic poles perpendicularly intersects a moving direction and the first and second magnets are arranged to have one of the magnetic poles face a coil axis of the induction coil assembly, and the magnetic poles of adjacent ones of the first and second magnets are arranged to be opposite to each other;

a conducting magnet assembly, which is arranged at one end of the induction coil assembly that is different from the acting magnet assembly, the conducting magnet assembly being movable, in synchronization with the acting magnet assembly, relative to the induction coil assembly, the conducting magnet assembly comprising at least two magnets arranged to space from each other and respectively defined as a third magnet and a fourth magnet, the third and fourth magnets being arranged to have two magnetic poles opposite to each other such that an axis line of left and right magnetic poles of the magnets is in parallel with a moving direction, the third and fourth magnets respectively corresponding to spacing locations between adjacent second and first magnets and between adjacent first and second magnets of the acting magnet assembly, lines as extensions of surfaces of the magnetic poles at two ends of the third and fourth magnets being coincident with lines of extensions of two side surfaces of the first and second magnets that are different from the magnetic poles thereof, the magnetic poles of the adjacent ones of the third and fourth magnets being arranged to have opposite polarities adjacent to each other, such that in a condition that the N magnetic pole of the first magnet faces the induction coil assembly, the S magnetic pole of the third magnet faces the N magnetic pole of the fourth magnet; and in a condition that the S magnetic pole of the second magnet faces the induction coil assembly, the N magnetic pole of the third magnet faces the S magnetic pole of the fourth magnet; and an induction switch module, which comprises an induction assembly arranged to correspond to an axis of the coil of the induction coil assembly, the induction switch module comprising an electrical cut-off detection assembly that is operable to detect the induction assembly and is arranged to correspond to each of two sides of the first magnet that are respectively moving into and moving away from the coil and an electrical conduction detection assembly that is operable to detect the induction assembly and is arranged at a center of the N magnetic pole of the first magnet, and an electrical conduction detection assembly that is operable to detect the induction assembly and is arranged on each of two sides of the second magnet that are respectively moving into and moving away from the coil and an electrical cut-off detection assembly that is operable to detect the induction assembly and is arranged at a center of the S magnetic pole of the second magnet in order to control an operation signal of conducting connection or cut-off between the coil and a load.

An interactive electromagnetic apparatus comprises:

an induction coil assembly, which comprises at least one coil;

an acting magnet assembly, which is arranged at one end of the induction coil assembly, the acting magnet assembly being movable relative to the induction coil assembly to generates an effect of electricity generation, the acting magnet assembly comprising two magnets that are arranged to space from each other and are respectively defined as a first magnet and a second magnet, the first and second magnets being arranged in a form having two magnetic poles located side by side, such that an axis line of upper and lower magnetic poles perpendicularly intersects a moving direction and the first and second magnets are arranged to have one of the magnetic poles face a coil axis of the induction coil assembly, and the magnetic poles of adjacent ones of the first and second magnets are arranged to be opposite to each other;

a conducting magnet assembly, which is arranged at one end of the induction coil assembly that is different from the acting magnet assembly, the conducting magnet assembly being movable, in synchronization with the acting magnet assembly, relative to the induction coil assembly, the conducting magnet assembly comprising at least two magnets arranged to space from each other and respectively defined as a third magnet and a fourth magnet, the third and fourth magnets being arranged to have two magnetic poles opposite to each other such that an axis line of left and right magnetic poles of the magnets is in parallel with a moving direction, the third and fourth magnets respectively corresponding to spacing locations between adjacent second and first magnets and between adjacent first and second magnets of the acting magnet assembly, lines as extensions of surfaces of the magnetic poles at two ends of the third and fourth magnets being coincident with lines of extensions of two side surfaces of the first and second magnets that are different from the magnetic poles thereof, the magnetic poles of the adjacent ones of the third and fourth magnets being arranged to have opposite polarities adjacent to each other, such that in a condition that the N magnetic pole of the first magnet faces the induction coil assembly, the N magnetic pole of the third magnet faces the S magnetic pole of the fourth magnet; and in a condition that the S magnetic pole of the second magnet faces the induction coil assembly, the S magnetic pole of the third magnet faces the N magnetic pole of the fourth magnet; and an induction switch module, which comprises an induction assembly arranged to correspond to an axis of the coil of the induction coil assembly, the induction switch module comprising an electrical conduction detection assembly that is operable to detect the induction assembly and is arranged to correspond to each of two sides of the first magnet that are respectively moving into and moving away from the coil and an electrical cut-off detection assembly that is operable to detect the induction assembly and is arranged at a center of the N magnetic pole of the first magnet, and an electrical cut-off detection assembly that is operable to detect the induction assembly and is arranged on each of two sides of the second magnet that are respectively moving into and moving away from the coil and an electrical conduction detection assembly that is operable to detect the induction assembly and is arranged at a center of the S magnetic pole of the second magnet in order to control an operation signal of conducting connection or cut-off between the coil and a load.

As such, the interactive electromagnetic apparatus of the present invention, which is realized through the technical measures described above, uses the arrangement that the acting magnet assembly that generates electricity is provided on one side of the induction coil assembly and the conducting magnet assembly that generates an effect of conduction is provided on the other side, in combination with the arrangement of the induction switch module 40 at different locations, to control an operation signal of conducting connection or cutting off between the coil and the load. As such, the induction coil assembly has only one end that is provided with the acting magnet assembly that has the function of power generation, so that the entire electromagnetic apparatus has only one signal magnetic resisting force under loading, so as to effectively reduce loss of kinetic energy, and further, the conducting magnet assembly could generate a magnetic assisting force for forward displacing so as to generate an effect of further speeding up operation, to thereby further enhance overall energy conversion rate, and thus greatly increasing the value thereof and heightening the economic value thereof.

To make Examiner better understand the structure, features, and other objectives of the present invention, the following exemplifies a preferred embodiment of the present invention, with reference to the attached drawings, to provide a detailed description, and also to help those skilled in the art the reduce into practice.

DETAILED DESCRIPTION OF THE PREFERRED EMBODIMENTS

Figure 1:
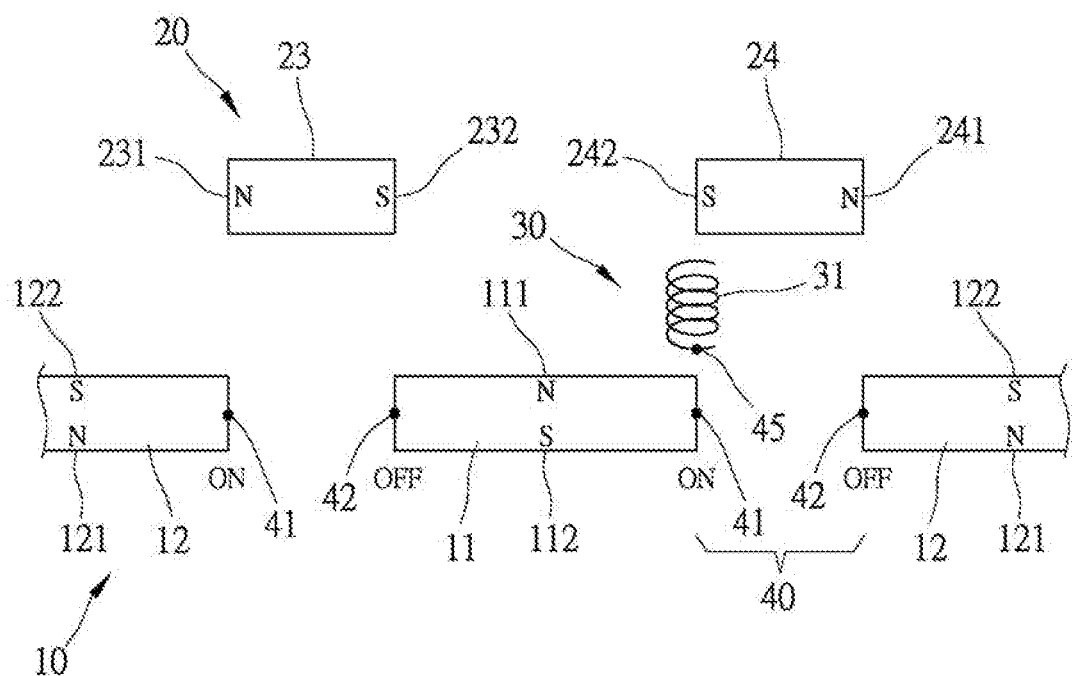
FIG. 1 is a schematic view showing a structure of a first embodiment of an interactive electromagnetic apparatus of the present invention to describe relationships among the components of the embodiment.
Figure 2A:
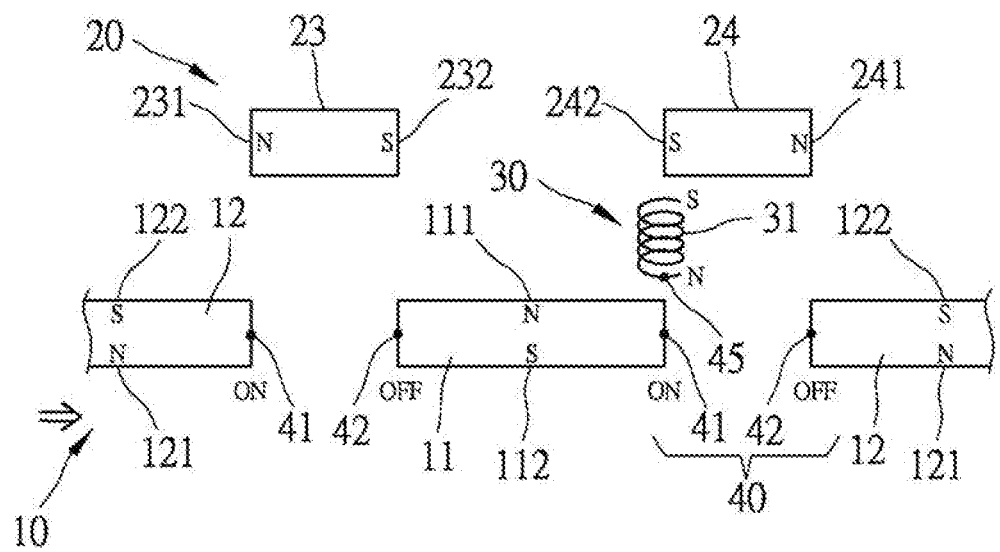
FIGS. 2A-2D are schematic views illustrating an operation of the first embodiment of the present invention in a first stage of conduction.
Figure 2B:
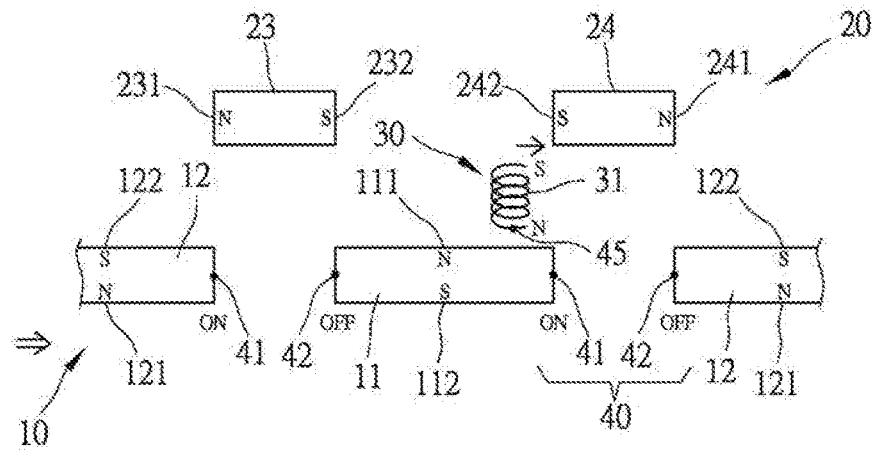
Figure 2C:
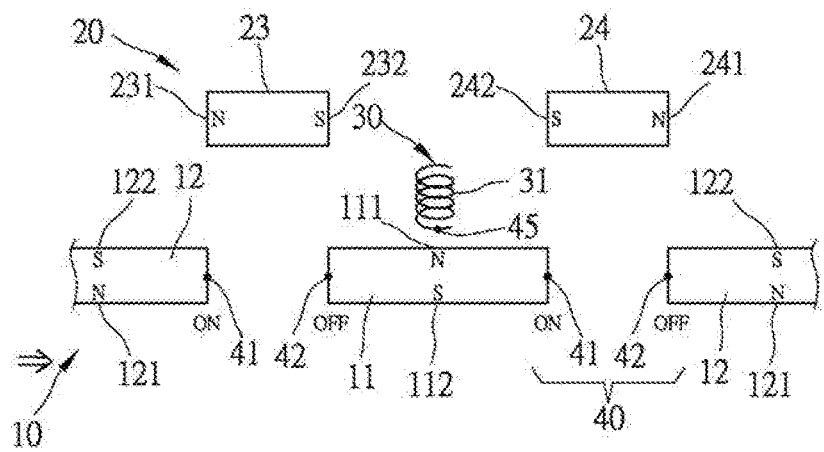
Figure 2D:
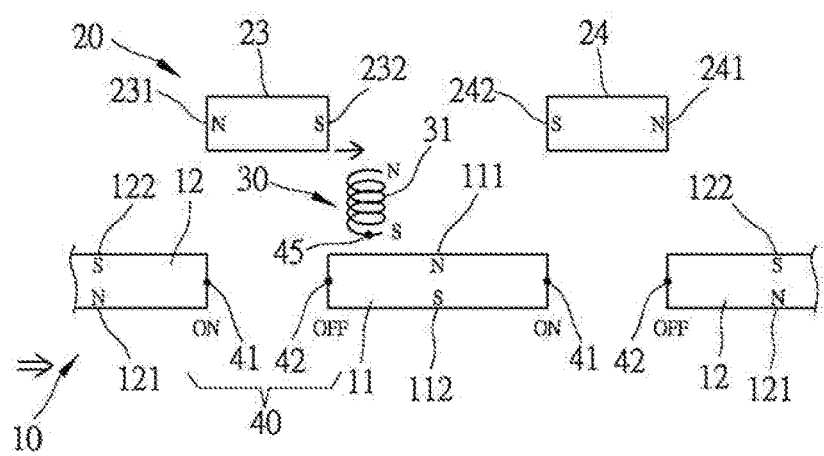

The present invention provides an interactive electromagnetic apparatus. In the embodiments of the present invention, as well as components/parts thereof, as exemplified in the drawings, references that are made to the terms of "front and rear", "left and right", "top and bottom", "upper and lower" and "horizontal and vertical" are taken simply for the purposes of easing the description and are not intended to impose limitations to the present invention, nor are they intended to limit any component/part to be at a specific location or in a specific spatial direction. Dimensional sizes that are shown in the drawings or described in the specification may be varied according to the designs and requirements of the specific embodiments of the present invention, without departure from the scope of the present invention as defined in the appended claims.

The interactive electromagnetic apparatus of the present invention is structured such that, as shown in FIG. 1, the electromagnetic apparatus comprises an acting magnet assembly 10, a conducting magnet assembly 20 spaced from and parallel with the acting magnet assembly 10, an induction coil assembly 30 arranged between the acting magnet assembly 10 and the conducting magnet assembly 20, and an induction switch module 40, wherein the induction coil assembly 30 is operable to generate relative rotation or linear movement with respect to the acting magnet assembly 10 and the conducting magnet assembly 20 and the induction switch module 40 is operable to control whether the induction coil assembly 30 is in conducting connection with a load or not.

A detailed structural arrangement of a first embodiment of the interactive electromagnetic apparatus of the present invention is referred to the illustration of FIG. 1, wherein the acting magnet assembly 10 is made up of at least two magnets 11, 12 lined up in a spaced manner and respectively referred to as a first magnet 11 and a second magnet 12. The first and second magnets 11, 12 have upper and lower portions that are respectively defined as an N magnetic pole 111, 121 and an S magnetic pole 112, 122. Further, the first and second magnets 11, 12 are arranged in a form having two magnetic poles located side by side, namely an axis line of upper and lower magnetic poles perpendicularly intersects a moving direction. Further, the first and second magnets 11, 12 are arranged such that one of the magnetic poles faces a coil axis of the induction coil assembly 30 to generate an effect of electricity generation. And, the magnetic poles of adjacent ones of the first and second magnets 11, 12 are arranged to be opposite to each other, namely when the first magnet 11 is arranged to have the N magnetic pole 111 thereof face the induction coil assembly 30, the second magnet 12 is arranged to have the S magnetic pole 122 thereof face the induction coil assembly 30.

Further, the conducting magnet assembly 20 is made up of at least two magnets 23, 24 lined up in a spaced manner and respectively referred to as a third magnet 23 and a fourth magnet 24. The third and fourth magnets 23, 24 have left and right portions that are respectively defined as an N magnetic pole 231, 241 and an S magnetic pole 232, 242. Further, the third and fourth magnets 23, 24 are arranged to have two magnetic poles opposite to each other, namely, an axis line of the left and right magnetic poles of the magnets is in parallel with a moving direction so as not to generate an effect of electricity generation but conducting flow of magnetic lines of force of the first and second magnets 11, 12 of the acting magnet assembly 10. Further, the magnetic poles of the adjacent ones of the third and fourth magnets 23, 24 are arranged to have identical polarities adjacent to each other in the instant embodiment and are facing opposite pole of the first and second magnets 11, 12 of the acting magnet assembly 10, namely when the first magnet 11 is arranged to have the N magnetic pole 111 thereof face the induction coil assembly 30, the third and fourth magnets 23, 24 are arranged to have the S magnetic poles 232, 242 thereof face each other and face the N magnetic pole 111 of the first magnet 11; and when the second magnet 12 is arranged to have the S magnetic pole 122 face the induction coil assembly 30, the third and fourth magnets 23, 24 are arranged to have the N magnetic poles 231, 241 thereof face each other and face the S magnetic pole 122 of the second magnet 12. Further, the conducting magnet assembly 20 and the acting magnet assembly 10 are movable in synchronization with each other and the third and fourth magnets 23, 24 of the conducting magnet assembly 20 respectively correspond to the spacing locations between adjacent second and first magnets 12, 11 and between adjacent first and second magnets 11, 12 of the acting magnet assembly 10. Further, lines as extensions of the surfaces of the magnetic poles at two ends of the third and fourth magnets 23, 24 of the conducting magnet assembly 20 are coincident with lines of extensions of two side surfaces of the first and second magnets 11, 12 of the acting magnet assembly 10 that are different from the magnetic poles thereof.

Further, the induction coil assembly 30 is arranged between the acting magnet assembly 10 and the conducting magnet assembly 20 and the induction coil assembly 30 is made up of a coil 31. The coil 31 has two ends respectively facing and corresponding to the acting magnet assembly 10 and the conducting magnet assembly 20, namely the axis of the coil 31 perpendicularly intersects a moving direction.

In addition, the induction switch module 40 is made up of at least an electrical conduction detection assembly 41, an electrical cut-off detection assembly 42, and an induction assembly 45, wherein the induction assembly 45 is arranged on an end portion of the axis of the coil 31 of the induction coil assembly 30 that faces the acting magnet assembly 10; the electrical conduction detection assembly 41 of the induction switch module 40 is arranged on one side of the first and second magnets 11, 12 of the acting magnet assembly 10 that is moving into the coil 31; the electrical cut-off detection assembly 42 is arranged on one side of the first and second magnets 11, 12 of the acting magnet assembly 10 that is moving away from the coil 31 so that detection of the first and second magnets 11, 12 moving into or departing from a range of the coil 31 is carried out with the electrical conduction detection assembly 41 or the electrical cut-off detection assembly 42 on the first and second magnets 11, 12 and the induction assembly 45 on the coil 31 for controlling an operation signal of conducting connection or cutting off between the coil 31 and the load.

As such, an interactive electromagnetic apparatus that effectively reduces magnetic resisting force and forms a magnetic assisting force to speed up operation and thus increase energy conversion rate is constructed.

The electromagnetic apparatus of the present invention, when used, may effectively reduce magnetic resisting force and generate magnetic assisting force so as to reduce loss of kinetic energy, and a complete cycle of operation is shown in the illustrations of FIGS. 2-5. Reference is first made to FIGS. 2A-2D, in the acting magnet assembly 10 and the conducting magnet assembly 20 that are moved relative to the induction coil assembly 30, for the condition that the first magnet 11 of the acting magnet assembly 10 is moved into the coil 31, when the electrical conduction detection assembly 41 of the induction switch module 40 arranged on the first magnet 11 is corresponding to the induction assembly 45 on the coil 31 (as shown in FIG. 2A), the coil 31 and the load are set in a conducting condition and when the N magnetic pole 111 of the first magnet 11 starts to approach a center of the coil 31 (as shown in FIG. 2B), the coil 31, after being conducted, is caused to change magnetic pole to form an N magnetic pole, thereby generating a reverse blocking effect through repulsion between similar polarities, and the opposite end of the coil 31 is formed as an S magnetic pole at the same time. However, since the fourth magnet 24 of the conducting magnet assembly 20 is an S magnetic pole 242, a forward pushing effect due to repulsion between similar polarities is generated to thereby generating a magnetic assisting force for driving the conducting magnet assembly 20 and the acting magnet assembly 10 to move forward. Further, as shown in FIG. 2C, when the axis of the coil 31 corresponds to the center of the N magnetic pole 111 of the first magnet 11, a balanced, torque-free condition is formed and the maximum amount of power is generated; when the N magnetic pole 111 of the first magnet 11 passes over the center of the coil 31 (as shown in FIG. 2D), the corresponding end of the coil 31 is changed and increased to an S magnetic pole, so as to generate an opposite pulling effect through attraction between opposite polarities and the opposite end of the coil 31 forms, synchronously, an N magnetic pole. However, since the third magnet 23 of the other side in the conducting magnet assembly 20 is an S magnetic pole 232, a forward pulling effect through attraction between opposite polarities is generated to thereby generate a magnetic assisting force that pull the conducting magnet assembly 20 and the acting magnet assembly 10 to move forward. Since only one of the two ends of the induction coil assembly 30 is provided with the acting magnet assembly 10 that cuts and generates electricity, the entire electromagnetic apparatus only generates one single magnetic resisting force, and thus, compared to the dual attraction point magnetic resisting force of the prior art, loss of kinetic energy can be effectively reduced and since the other end of the induction coil assembly 30 is made as the conducting magnet assembly 20 that does not cut and generate electricity so that the entire electromagnetic apparatus generates a forward magnetic assistance force, and thus compared to the dual attraction point magnetic resisting force of the prior art, operation can be sped up to increase energy conversion rate.

Figure 3A:
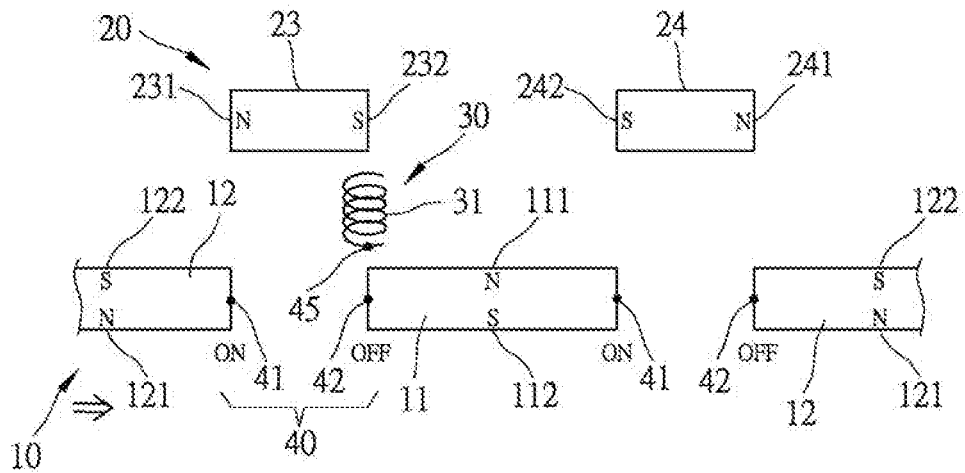
FIGS. 3A and 3B are schematic views illustrating an operation of the first embodiment of the present invention in a second stage of conduction.
Figure 3B:
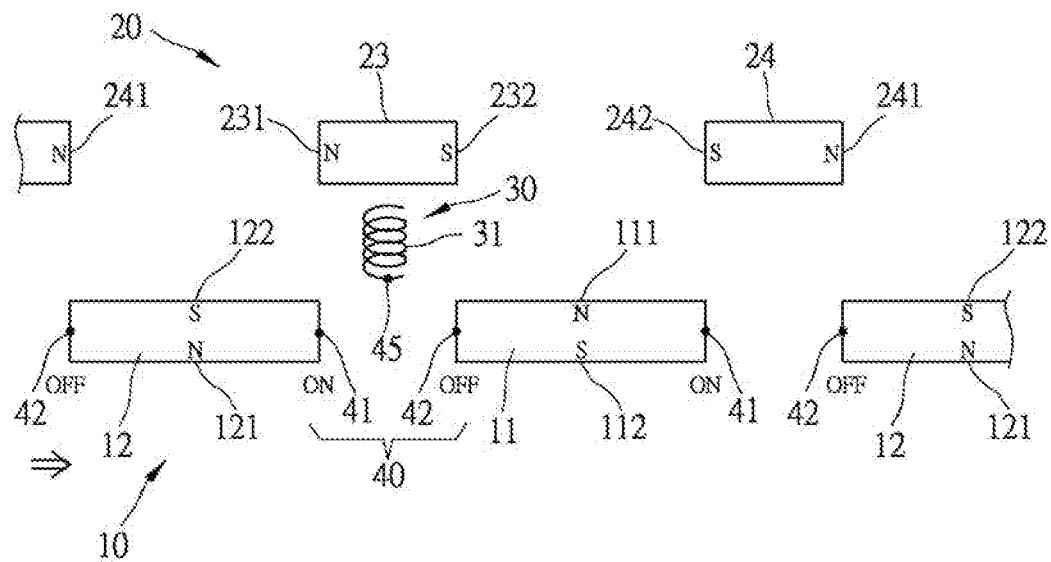

Further, when the electrical cut-off detection assembly 42 of the induction switch module 40 on the other end of the first magnet 11 corresponds to the induction assembly 45 of the coil 31 (as shown in FIG. 3A), then it is determined the acting magnet assembly 10 and the induction coil assembly 30 are separated so as to set the coil 31 and the load in a cut-off condition, making it possible to prevent, in a non-loading condition, the induction coil assembly 30 from generating, with respect to the conducting magnet assembly 20, a magnetic resisting force of opposite pulling through attraction between opposite polarities. When the acting magnet assembly 10 is moved from the first magnet 11 toward the second magnet 12 (as shown in FIG. 3B), the forward magnetic assistance force as generated previously and the effect of reducing reverse magnetic resistance force can be used to reduce loss of kinetic energy of the operation of the magnet assembly, allowing it to be driven by inertia.

Figure 4A:
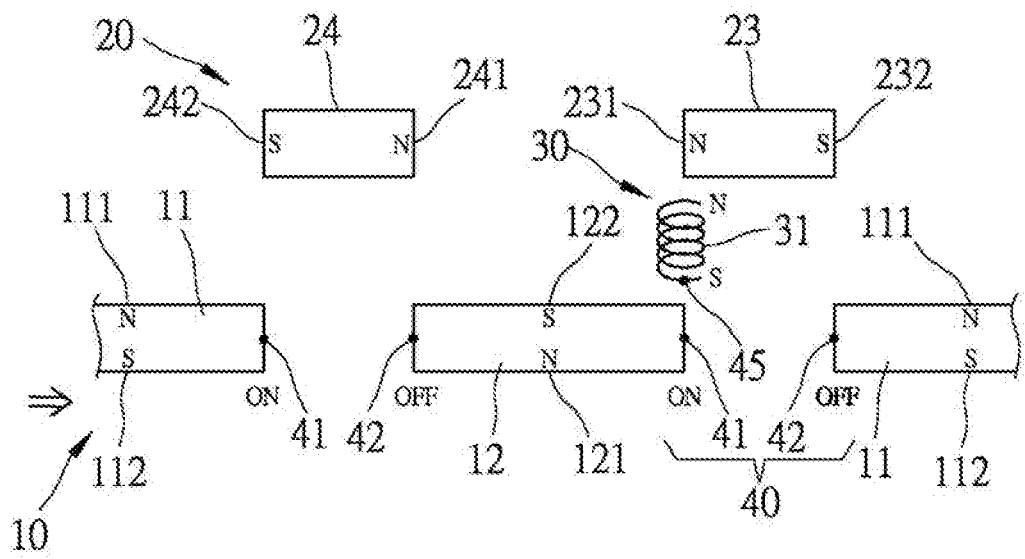
FIGS. 4A-4D are schematic views illustrating an operation of the first embodiment of the present invention in a third stage of conduction.
Figure 4B:
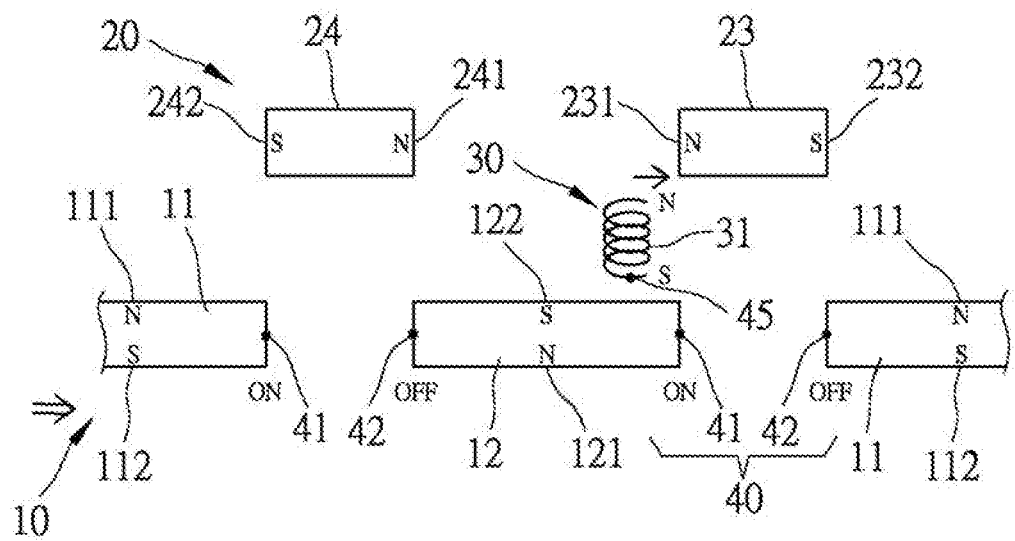
Figure 4C:
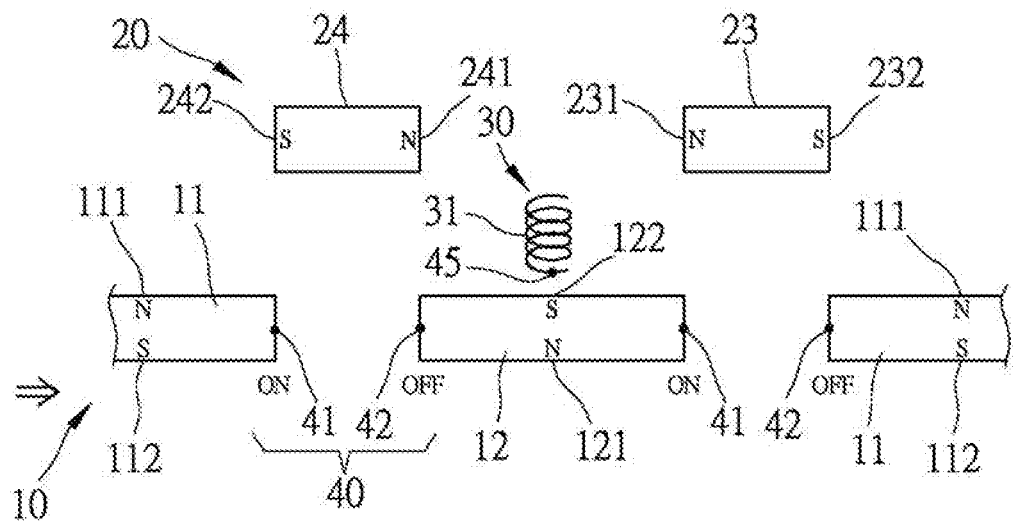
Figure 4D:
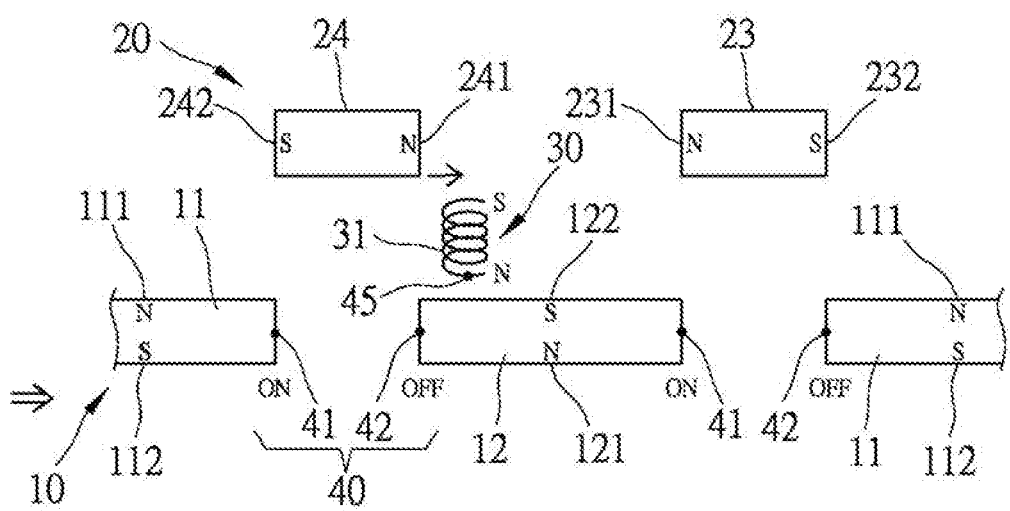

Next, as shown in FIGS. 4A-4D, a condition where in the acting magnet assembly 10 and the conducting magnet assembly 20 that are moved relative to the induction coil assembly 30, the second magnet 12 of the acting magnet assembly 10 is moved into the range of the coil 31 of the induction coil assembly 30 is disclosed. When the electrical conduction detection assembly 41 of the induction switch module 40 provided on the second magnet 12 corresponds to the induction assembly 45 on the coil 31 (as shown in FIG. 4A), the coil 31 and the load are controlled to be in a conducting condition. When the S magnetic pole 122 of the second magnet 12 starts to approach the center of the coil 31 (as shown in FIG. 4B), the coil 31, after conducting on, causes and increase change of magnetic polarity to form an S magnetic pole, thereby generating an opposite blocking effect through repulsion between identical polarities, and the opposite end of the coil 31 synchronously form an N magnetic pole. However, since the third magnet 23 of the conducting magnet assembly 20 is N magnetic pole 231, a forward pushing effect through repulsion between identical polarities is generated to thereby generate a magnetic assisting force for driving the conducting magnet assembly 20 and the acting magnet assembly 10 to move forward. Further, as shown in FIG. 4C, when the axis of the coil 31 corresponds to the center of the S magnetic pole 122 of the second magnet 12 a balanced, torque-free condition is formed and the maximum amount of power is generated; when the S magnetic pole 122 of the second magnet 12 passes over the center of the coil 31 (as shown in FIG. 4D), the corresponding end of the coil 31 is changed and increased to an N magnetic pole, so as to generate an opposite pulling effect through attraction between opposite polarities and the opposite end of the coil 31 forms, synchronously, an S magnetic pole. However, since the fourth magnet 24 of the other side in the conducting magnet assembly 20 is an N magnetic pole 241, a forward pulling effect through attraction between opposite polarities is generated to thereby generate a magnetic assisting force that pull the conducting magnet assembly 20 and the acting magnet assembly 10 to move forward. Since only one of the two ends of the induction coil assembly 30 is provided with the acting magnet assembly 10 that cuts and generates electricity, the entire electromagnetic apparatus only generates one single magnetic resisting force, and thus, compared to the dual attraction point magnetic resisting force of the prior art, loss of kinetic energy can be effectively reduced and since the other end of the induction coil assembly 30 is made as the conducting magnet assembly 20 that does not cut and generate electricity so that the entire electromagnetic apparatus generates a forward magnetic assistance force, and thus compared to the dual attraction point magnetic resisting force of the prior art, operation can be sped up to increase energy conversion rate.

Figure 5A:
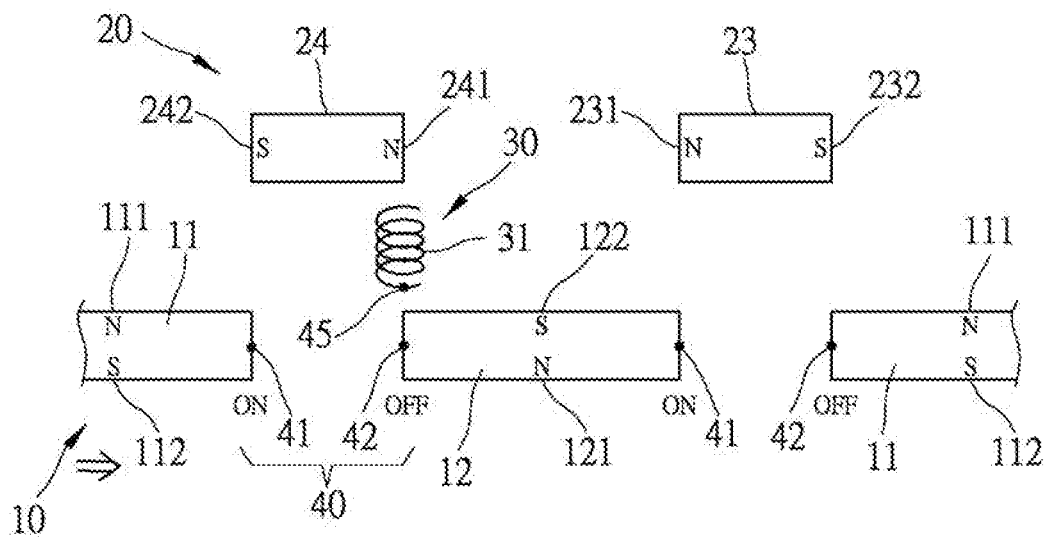
FIGS. 5A and 5B are schematic views illustrating an operation of the first embodiment of the present invention in a fourth stage of cut-off.
Figure 5B:
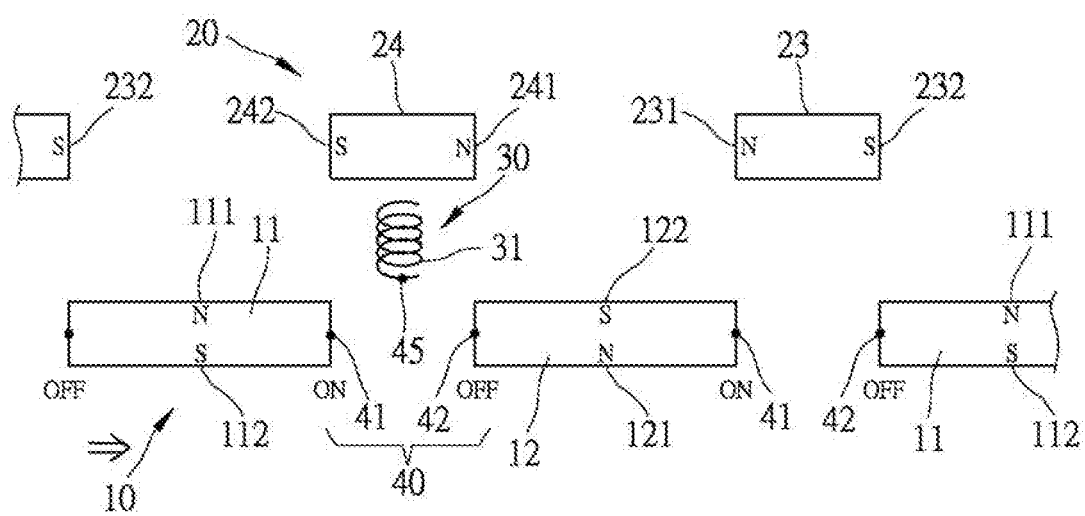

Finally, when the electrical cut-off detection assembly 42 of the induction switch module 40 on the other end of the second magnet 11 corresponds to the induction assembly 45 of the coil 31 (as shown in FIG. 5A), then it is determined the acting magnet assembly 10 and the induction coil assembly 30 are separated so as to set the coil 31 and the load in a cut-off condition, making it possible to prevent, in a non-loading condition, the induction coil assembly 30 from generating, with respect to the conducting magnet assembly 20, a magnetic resisting force of opposite pulling through attraction between opposite polarities. When the acting magnet assembly 10 is moved from the second magnet 12 toward the first magnet 11 (as shown in FIG. 5B), the forward magnetic assistance force as generated previously and the effect of reducing reverse magnetic resistance force can be used to reduce loss of kinetic energy of the operation of the magnet assembly, allowing it to be driven by inertia.

In summary, based on the complete cycle illustrated in FIGS. 2A-5B, since the entire electromagnetic apparatus has only one single magnetic resisting force, which, as compared to the dual attraction point magnetic resisting force of the prior art, could effectively reduce an opposite force and allow for use of the conducting magnet assembly 20 and the induction switch module 40 to generate a forward force to, in addition to effective reduction of loss of kinetic energy, also speeds up operation, thereby enhance overall energy conversion rate.

Figure 6:
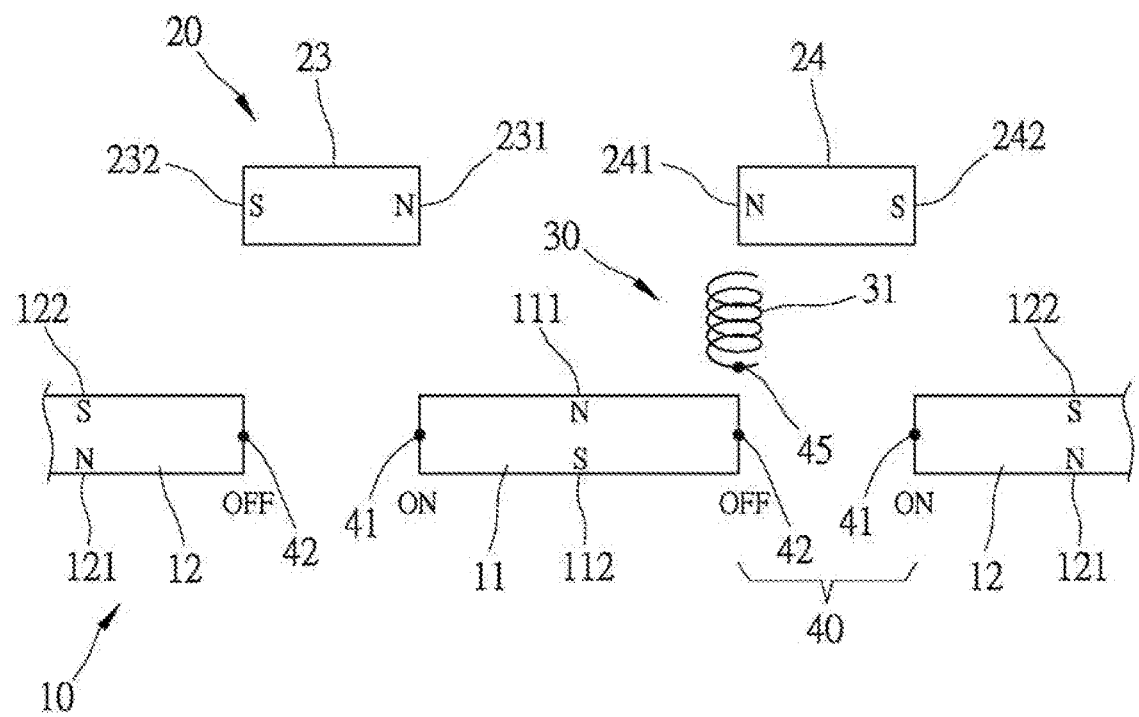
FIG. 6 is a schematic view showing a structure of a second embodiment of an interactive electromagnetic apparatus of the present invention to describe relationships among the components of the embodiment.

Further, as shown in FIG. 6, a second embodiment of the interactive electromagnetic apparatus of the present invention is provided. The instant embodiment is different from the previously described first embodiment in that the magnetic poles of the adjacent ones of the third and fourth magnets 23, 24 are arranged to have identical polarities adjacent to each other and are facing the same polarity of the first and second magnets 11, 12 of the acting magnet assembly 10, namely when the first magnet 11 is arranged to have the N magnetic pole 111 thereof face the induction coil assembly 30, the third and fourth magnets 23, 24 are arranged to have the N magnetic poles 231, 241 thereof face each other and face the N magnetic pole 111 of the first magnet 11; and when the second magnet 12 is arranged to have the S magnetic pole 122 face the induction coil assembly 30, the third and fourth magnets 23, 24 are arranged to have the S magnetic poles 232, 242 thereof face each other and face the S magnetic pole 122 of the second magnet 12. Further, the electrical cut-off detection assembly 42 of the induction switch module 40 is arranged on one side of the first and second magnets 11, 12 of the acting magnet assembly 10 that is moving into the coil 31; the electrical conduction detection assembly 41 is arranged on one side of the first and second magnets 11, 12 of the acting magnet assembly 10 that is moving away from the coil 31 so that detection can be carried out with the electrical conduction detection assembly 41 or the electrical cut-off detection assembly 42, which are arranged at different locations on the first and second magnets 11, 12, and the induction assembly 45 on the coil 31 for controlling an operation signal of conducting connection or cutting off between the coil 31 and the load, whereby an interactive electromagnetic apparatus that effectively reduces magnetic resisting force and forms a magnetic assisting force that generates a forward displacing movement is constructed.

Figure 7:
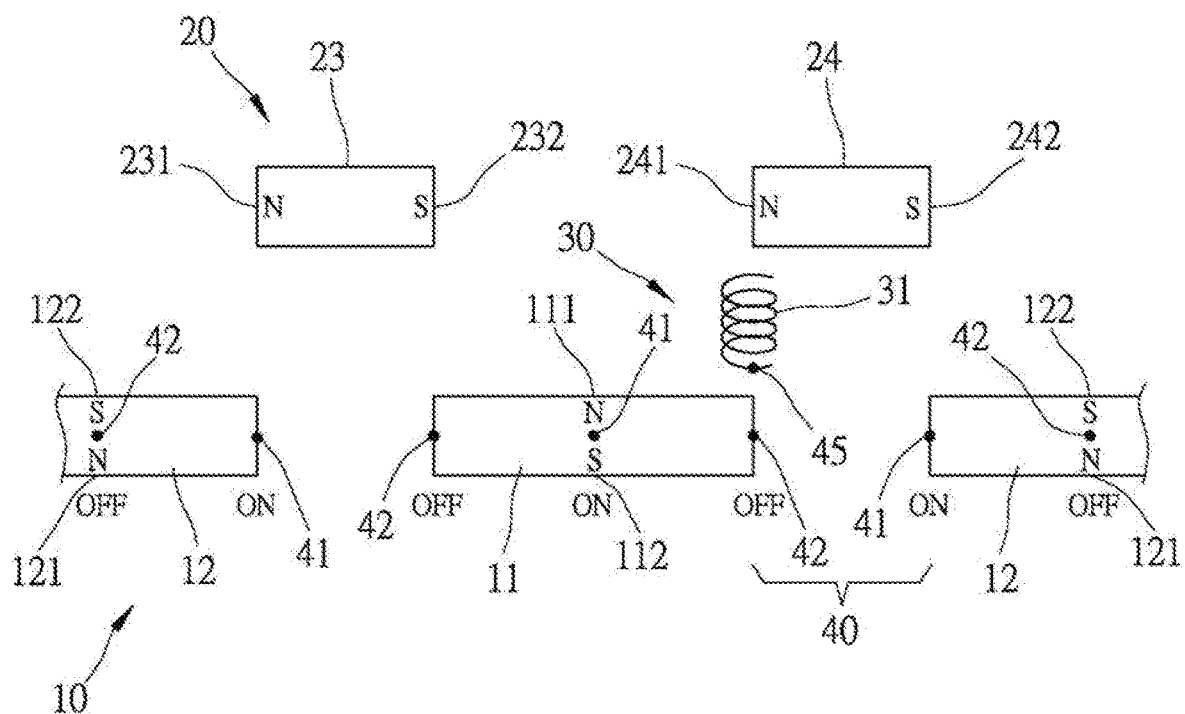
FIG. 7 is a schematic view showing a structure of a third embodiment of an interactive electromagnetic apparatus of the present invention to describe relationships among the components of the embodiment.

Further as shown in FIG. 7, a third embodiment of the interactive electromagnetic apparatus of the present invention is shown. The instant embodiment is different from the previously described first embodiment in that the magnetic poles of the adjacent ones of the third and fourth magnets 23, 24 are arranged to have opposite polarities adjacent to each other, namely when the first magnet 11 is arranged to have the N magnetic pole 111 thereof face the induction coil assembly 30, the third magnet 23 is arranged to have the S magnetic pole 232 thereof face the N magnetic pole 241 of the fourth magnet 24 and when the second magnet 12 is arranged to have the S magnetic pole 122 thereof face the induction coil assembly 30, the third magnet 23 is arranged to have the N magnetic pole 231 thereof face the S magnetic pole 242 of the fourth magnet 24. And, the induction switch module 40 is arranged to have an electrical cut-off detection assembly 42 provided on each of two sides of the first magnet 11 that are respectively moving into and moving away from the coil 31, and an electrical conduction detection assembly 41 arranged at a center of the N magnetic pole 111 of the first magnet 11; and two sides of the second magnet 12 that are respectively moving into and moving away from the coil 31 are each provided with an electrical conduction detection assembly 41, while an electrical cut-off detection assembly 42 is provided at a center of the S magnetic pole 122 of the second magnet 12 so that detection can be carried out with the electrical conduction detection assemblies 41 or the electrical cut-off detection assemblies 42, which are arranged at different locations on the first and second magnets 11, 12, and the induction assembly 45 on the coil 31 for controlling an operation signal of conducting connection or cutting off between the coil 31 and the load, whereby an interactive electromagnetic apparatus that effectively reduces magnetic resisting force and forms a magnetic assisting force that generates a forward displacing movement is constructed.

Figure 8:
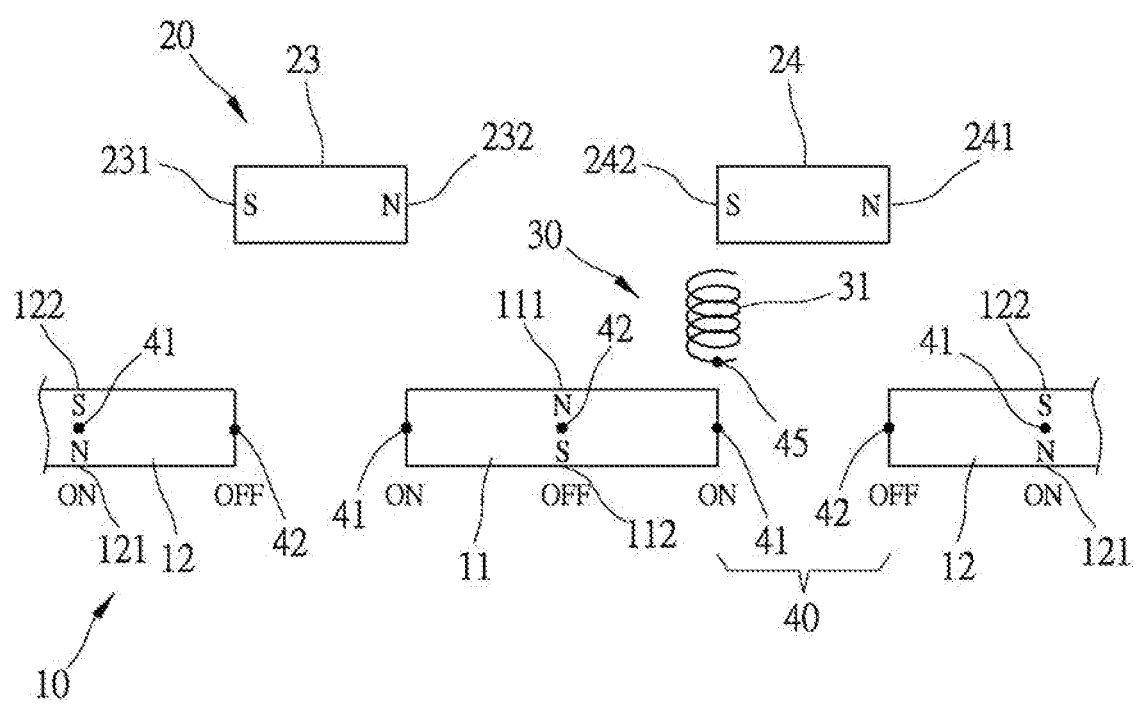
FIG. 8 is a schematic view showing a structure of a fourth embodiment of an interactive electromagnetic apparatus of the present invention to describe relationships among the components of the embodiment.

Further, as shown in FIG. 8, a fourth embodiment of the interactive electromagnetic apparatus of the present invention is shown. The instant embodiment is different from the previously described first embodiment in that the magnetic poles of the adjacent ones of the third and fourth magnets 23, 24 are arranged to have opposite polarities adjacent to each other, namely when the first magnet 11 is arranged to have the N magnetic pole 111 thereof face the induction coil assembly 30, the third magnet 23 is arranged to have the N magnetic pole 231 thereof face the S magnetic pole 242 of the fourth magnet 24 and when the second magnet 12 is arranged to have the S magnetic pole 122 thereof face the induction coil assembly 30, the third magnet 23 is arranged to have the S magnetic pole 232 thereof face the N magnetic pole 241 of the fourth magnet 24. And, the induction switch module 40 is arranged to have an electrical conduction detection assembly 41 provided on each of two sides of the first magnet 11 that are respectively moving into and moving away from the coil 31, and an electrical cut-off detection assembly 42 arranged at a center of the N magnetic pole 111 of the first magnet 11; and two sides of the second magnet 12 that are respectively moving into and moving away from the coil 31 are each provided with an electrical cut-off detection assembly 42, while an electrical conduction detection assembly 42 is provided at a center of the S magnetic pole 122 of the second magnet 12 so that detection can be carried out with the electrical conduction detection assemblies 41 or the electrical cut-off detection assemblies 42, which are arranged at different locations on the first and second magnets 11, 12, and the induction assembly 45 on the coil 31 for controlling an operation signal of conducting connection or cutting off between the coil 31 and the load, whereby an interactive electromagnetic apparatus that effectively reduces magnetic resisting force and forms a magnetic assisting force that generates a forward displacing movement is constructed.

Based on the explanation provided previously, the interactive electromagnetic apparatus of the present invention uses the arrangement that the acting magnet assembly 10 that generates electricity is provided on one side of the induction coil assembly 30 and the conducting magnet assembly 20 that generates an effect of conduction is provided on the other side, in combination with the arrangement of the electrical conduction detection assembly 41, the electrical cut-off detection assembly 42 and the induction assembly 45 of the induction switch module 40 that are provided at different locations on the first and second magnets 11, 12 of the acting magnet assembly 10 to detect the location of the coil 31 and control an operation signal of conducting connection or cutting off between the coil 31 and the load. Since the induction coil assembly 30 has only one end that is provided with the acting magnet assembly 10 that has the function of power generation, the entire electromagnetic apparatus has only one signal magnetic resisting force under loading, which, as compared to the dual attraction point magnetic resisting force of the prior art, could effectively reduce loss of kinetic energy, and further, the conducting magnet assembly 20 could generate a magnetic assisting force for forward displacing so as to further speed up operation, to thereby effectively enhance overall energy conversion rate.

As such, it is understood that the present invention provides an invention of extreme creativity to greatly improve performance thereof, in addition to overcoming all the problems of the prior art. The embodiments provided above and the drawings thereof are not provided to limit the forms and types of products of the present invention. Any proper variations or modifications available to those having ordinary skills in the technical field are considered within the scope of the present invention defined by the claims.

We claim:

1. An interactive electromagnetic apparatus, characterized by comprising:
    an induction coil assembly, which comprises at least one coil;
    an acting magnet assembly, which is arranged at one end of the induction coil assembly, the acting magnet assembly being movable relative to the induction coil assembly to generates an effect of electricity generation, the acting magnet assembly comprising two magnets that are arranged to space from each other and are respectively defined as a first magnet and a second magnet, the first and second magnets being arranged in a form having two magnetic poles located side by side, such that an axis line of upper and lower magnetic poles perpendicularly intersects a moving direction and the first and second magnets are arranged to have one of the magnetic poles face a coil axis of the induction coil assembly, and the magnetic poles of adjacent ones of the first and second magnets are arranged to be opposite to each other;
    a conducting magnet assembly, which is arranged at one end of the induction coil assembly that is different from the acting magnet assembly, the conducting magnet assembly being movable, in synchronization with the acting magnet assembly, relative to the induction coil assembly, the conducting magnet assembly comprising at least two magnets arranged to space from each other and respectively defined as a third magnet and a fourth magnet, the third and fourth magnets being arranged to have two magnetic poles opposite to each other such that an axis line of left and right magnetic poles of the magnets is in parallel with a moving direction, the third and fourth magnets respectively corresponding to spacing locations between adjacent second and first magnets and between adjacent first and second magnets of the acting magnet assembly, lines as extensions of surfaces of the magnetic poles at two ends of the third and fourth magnets being coincident with lines of extensions of two side surfaces of the first and second magnets that are different from the magnetic poles thereof, the magnetic poles of the adjacent ones of the third and fourth magnets being arranged to have identical polarities adjacent to each other and facing opposite pole of the first and second magnets of the acting magnet assembly; and
    an induction switch module, which comprises an induction assembly arranged to correspond to an axis of the coil of the induction coil assembly, the induction switch module comprising an electrical conduction detection assembly that is operable to detect the induction assembly and is arranged to correspond to one side of each of the first and second magnets that is relatively moving into the coil and an electrical cut-off detection assembly that is operable to detect the induction assembly and is arranged to correspond to one side of each of the first and second magnets that is relatively moving away from the coil in order to control an operation signal of conducting connection or cut-off between the coil and a load.

2. The interactive electromagnetic apparatus according to claim 1, characterized in that in a condition that the N magnetic pole of the first magnet faces the induction coil assembly, the S magnetic poles of the third and fourth magnets face each other and face the N magnetic pole of the first magnet; and in a condition that the S magnetic pole of the second magnet faces the induction coil assembly, the N magnetic poles of the third and fourth magnets face each other and face the S magnetic pole of the second magnet.

3. An interactive electromagnetic apparatus, characterized by comprising:
    an induction coil assembly, which comprises at least one coil;
    an acting magnet assembly, which is arranged at one end of the induction coil assembly, the acting magnet assembly being movable relative to the induction coil assembly to generates an effect of electricity generation, the acting magnet assembly comprising two magnets that are arranged to space from each other and are respectively defined as a first magnet and a second magnet, the first and second magnets being arranged in a form having two magnetic poles located side by side, such that an axis line of upper and lower magnetic poles perpendicularly intersects a moving direction and the first and second magnets are arranged to have one of the magnetic poles face a coil axis of the induction coil assembly, and the magnetic poles of adjacent ones of the first and second magnets are arranged to be opposite to each other;
    a conducting magnet assembly, which is arranged at one end of the induction coil assembly that is different from the acting magnet assembly, the conducting magnet assembly being movable, in synchronization with the acting magnet assembly, relative to the induction coil assembly, the conducting magnet assembly comprising at least two magnets arranged to space from each other and respectively defined as a third magnet and a fourth magnet, the third and fourth magnets being arranged to have two magnetic poles opposite to each other such that an axis line of left and right magnetic poles of the magnets is in parallel with a moving direction, the third and fourth magnets respectively corresponding to spacing locations between adjacent second and first magnets and between adjacent first and second magnets of the acting magnet assembly, lines as extensions of surfaces of the magnetic poles at two ends of the third and fourth magnets being coincident with lines of extensions of two side surfaces of the first and second magnets that are different from the magnetic poles thereof, the magnetic poles of the adjacent ones of the third and fourth magnets being arranged to have identical polarities adjacent to each other and facing opposite pole of the first and second magnets of the acting magnet assembly; and
    an induction switch module, which comprises an induction assembly arranged to correspond to an axis of the coil of the induction coil assembly, the induction switch module comprising an electrical cut-off detection assembly that is operable to detect the induction assembly and is arranged at one side of each of the first and second magnets that is moving into the coil and an electrical conduction detection assembly that is operable to detect the induction assembly and is arranged at one side of the first and second magnets that is moving away from the coil in order to control an operation signal of conducting connection or cut-off between the coil and a load.

4. The interactive electromagnetic apparatus according to claim 3, characterized in that in a condition that the N magnetic pole of the first magnet faces the induction coil assembly, the S magnetic poles of the third and fourth magnets face each other and face the N magnetic pole of the first magnet; and in a condition that the S magnetic pole of the second magnet faces the induction coil assembly, the N magnetic poles of the third and fourth magnets face each other and face the S magnetic pole of the second magnet.

5. An interactive electromagnetic apparatus, characterized by comprising:
  an induction coil assembly, which comprises at least one coil;
  an acting magnet assembly, which is arranged at one end of the induction coil assembly, the acting magnet assembly being movable relative to the induction coil assembly to generates an effect of electricity generation, the acting magnet assembly comprising two magnets that are arranged to space from each other and are respectively defined as a first magnet and a second magnet, the first and second magnets being arranged in a form having two magnetic poles located side by side, such that an axis line of upper and lower magnetic poles perpendicularly intersects a moving direction and the first and second magnets are arranged to have one of the magnetic poles face a coil axis of the induction coil assembly, and the magnetic poles of adjacent ones of the first and second magnets are arranged to be opposite to each other;
  a conducting magnet assembly, which is arranged at one end of the induction coil assembly that is different from the acting magnet assembly, the conducting magnet assembly being movable, in synchronization with the acting magnet assembly, relative to the induction coil assembly, the conducting magnet assembly comprising at least two magnets arranged to space from each other and respectively defined as a third magnet and a fourth magnet, the third and fourth magnets being arranged to have two magnetic poles opposite to each other such that an axis line of left and right magnetic poles of the magnets is in parallel with a moving direction, the third and fourth magnets respectively corresponding to spacing locations between adjacent second and first magnets and between adjacent first and second magnets of the acting magnet assembly, lines as extensions of surfaces of the magnetic poles at two ends of the third and fourth magnets being coincident with lines of extensions of two side surfaces of the first and second magnets that are different from the magnetic poles thereof, the magnetic poles of the adjacent ones of the third and fourth magnets being arranged to have opposite polarities adjacent to each other, such that in a condition that the N magnetic pole of the first magnet faces the induction coil assembly, the S magnetic pole of the third magnet faces the N magnetic pole of the fourth magnet; and in a condition that the S magnetic pole of the second magnet faces the induction coil assembly, the N magnetic pole of the third magnet faces the S magnetic pole of the fourth magnet; and
  an induction switch module, which comprises an induction assembly arranged to correspond to an axis of the coil of the induction coil assembly, the induction switch module comprising an electrical cut-off detection assembly that is operable to detect the induction assembly and is arranged to correspond to each of two sides of the first magnet that are respectively moving into and moving away from the coil and an electrical conduction detection assembly that is operable to detect the induction assembly and is arranged at a center of the N magnetic pole of the first magnet, and an electrical conduction detection assembly that is operable to detect the induction assembly and is arranged on each of two sides of the second magnet that are respectively moving into and moving away from the coil and an electrical cut-off detection assembly that is operable to detect the induction assembly and is arranged at a center of the S magnetic pole of the second magnet in order to control an operation signal of conducting connection or cut-off between the coil and a load.

6. An interactive electromagnetic apparatus, characterized by comprising:
  an induction coil assembly, which comprises at least one coil;
  an acting magnet assembly, which is arranged at one end of the induction coil assembly, the acting magnet assembly being movable relative to the induction coil assembly to generates an effect of electricity generation, the acting magnet assembly comprising two magnets that are arranged to space from each other and are respectively defined as a first magnet and a second magnet, the first and second magnets being arranged in a form having two magnetic poles located side by side, such that an axis line of upper and lower magnetic poles perpendicularly intersects a moving direction and the first and second magnets are arranged to have one of the magnetic poles face a coil axis of the induction coil assembly, and the magnetic poles of adjacent ones of the first and second magnets are arranged to be opposite to each other;
  a conducting magnet assembly, which is arranged at one end of the induction coil assembly that is different from the acting magnet assembly, the conducting magnet assembly being movable, in synchronization with the acting magnet assembly, relative to the induction coil assembly, the conducting magnet assembly comprising at least two magnets arranged to space from each other and respectively defined as a third magnet and a fourth magnet, the third and fourth magnets being arranged to have two magnetic poles opposite to each other such that an axis line of left and right magnetic poles of the magnets is in parallel with a moving direction, the third and fourth magnets respectively corresponding to spacing locations between adjacent second and first magnets and between adjacent first and second magnets of the acting magnet assembly, lines as extensions of surfaces of the magnetic poles at two ends of the third and fourth magnets being coincident with lines of extensions of two side surfaces of the first and second magnets that are different from the magnetic poles thereof, the magnetic poles of the adjacent ones of the third and fourth magnets being arranged to have opposite polarities adjacent to each other, such that in a condition that the N magnetic pole of the first magnet faces the induction coil assembly, the N magnetic pole of the third magnet faces the S magnetic pole of the fourth magnet; and in a condition that the S magnetic pole of the second magnet faces the induction coil assembly, the S magnetic pole of the third magnet faces the N magnetic pole of the fourth magnet; and
  an induction switch module, which comprises an induction assembly arranged to correspond to an axis of the coil of the induction coil assembly, the induction switch module comprising an electrical conduction detection assembly that is operable to detect the induction assembly and is arranged to correspond to each of two sides of the first magnet that are respectively moving into and moving away from the coil and an electrical cut-off detection assembly that is operable to detect the induction assembly and is arranged at a center of the N magnetic pole of the first magnet, and an electrical cut-off detection assembly that is operable to detect the induction assembly and is arranged on each of two sides of the second magnet that are respectively moving into and moving away from the coil and an electrical conduction detection assembly that is operable to detect the induction assembly and is arranged at a center of the S magnetic pole of the second magnet in order to control an operation signal of conducting connection or cut-off between the coil and a load.

* * * * *